United States Patent
Hoshtanar

(10) Patent No.: US 8,970,796 B2
(45) Date of Patent: Mar. 3, 2015

(54) FIELD-LINE REPEATER (FLR) STRUCTURE OF A SENSE ARRAY

(71) Applicant: Cypress Semiconductor Corporation, San Jose, CA (US)

(72) Inventor: Oleksandr Hoshtanar, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 26 days.

(21) Appl. No.: 14/015,720

(22) Filed: Aug. 30, 2013

(65) Prior Publication Data

US 2014/0320757 A1    Oct. 30, 2014

Related U.S. Application Data

(60) Provisional application No. 61/816,442, filed on Apr. 26, 2013.

(51) Int. Cl.
- *G02F 1/1335* (2006.01)
- *G06F 3/044* (2006.01)
- *G06F 3/041* (2006.01)

(52) U.S. Cl.
CPC .............. *G06F 3/044* (2013.01); *G06F 3/0412* (2013.01)
USPC .............................. 349/12; 345/173; 345/174

(58) Field of Classification Search
CPC .... G06F 3/044; G06F 3/0412; G02F 1/13338
USPC ..................... 349/12; 345/173, 174
See application file for complete search history.

(56) References Cited

U.S. PATENT DOCUMENTS

| | | | |
|---|---|---|---|
| 7,154,481 B2 | 12/2006 | Cross et al. | |
| 8,125,463 B2 | 2/2012 | Hotelling et al. | |
| 8,388,852 B2 | 3/2013 | Huang et al. | |
| 2005/0200799 A1 | 9/2005 | Murai | |
| 2008/0007539 A1 | 1/2008 | Hotelling | |
| 2009/0159344 A1 | 6/2009 | Hotelling et al. | |
| 2010/0045614 A1 | 2/2010 | Gray et al. | |
| 2010/0045615 A1 | 2/2010 | Gray et al. | |
| 2010/0108409 A1* | 5/2010 | Tanaka et al. | 178/18.06 |
| 2010/0302201 A1 | 12/2010 | Ritter et al. | |
| 2011/0069036 A1 | 3/2011 | Anno | |
| 2011/0304585 A1* | 12/2011 | Chang et al. | 345/174 |
| 2013/0068038 A1 | 3/2013 | Bolender et al. | |
| 2013/0093696 A1 | 4/2013 | Huang et al. | |

FOREIGN PATENT DOCUMENTS

| | | | |
|---|---|---|---|
| EP | 2592533 A1 | 5/2013 | |
| WO | 2005013219 A1 | 2/2010 | |

OTHER PUBLICATIONS

Search Report for "Field Line Repeater (FLR) structure of a sense array" Aug. 2013, 2 pages.

(Continued)

*Primary Examiner* — Lucy Chien
(74) *Attorney, Agent, or Firm* — Lowenstein Sandler LLP

(57) ABSTRACT

Apparatuses and methods of field-line repeater structures for sense arrays are described. One apparatus includes a substrate, a capacitive-sense array with electrodes disposed on one or more sides of the substrate in one or more layers and a protective cover layer disposed to cover the capacitive-sense array. A coating film is disposed over the protective cover layer and a field-line repeater (FLR) structure of floating electrodes is disposed between the coating film and the protective cover layer.

20 Claims, 15 Drawing Sheets

(56) References Cited

OTHER PUBLICATIONS

International Search Report for International Application No. PCT/US13/58972, dated Feb. 19, 2014; 2 pages.

Written Opinion of the International Searching Authority for International Application No. PCT/US13/58972, dated Feb. 19, 2014; 6 pages.

* cited by examiner

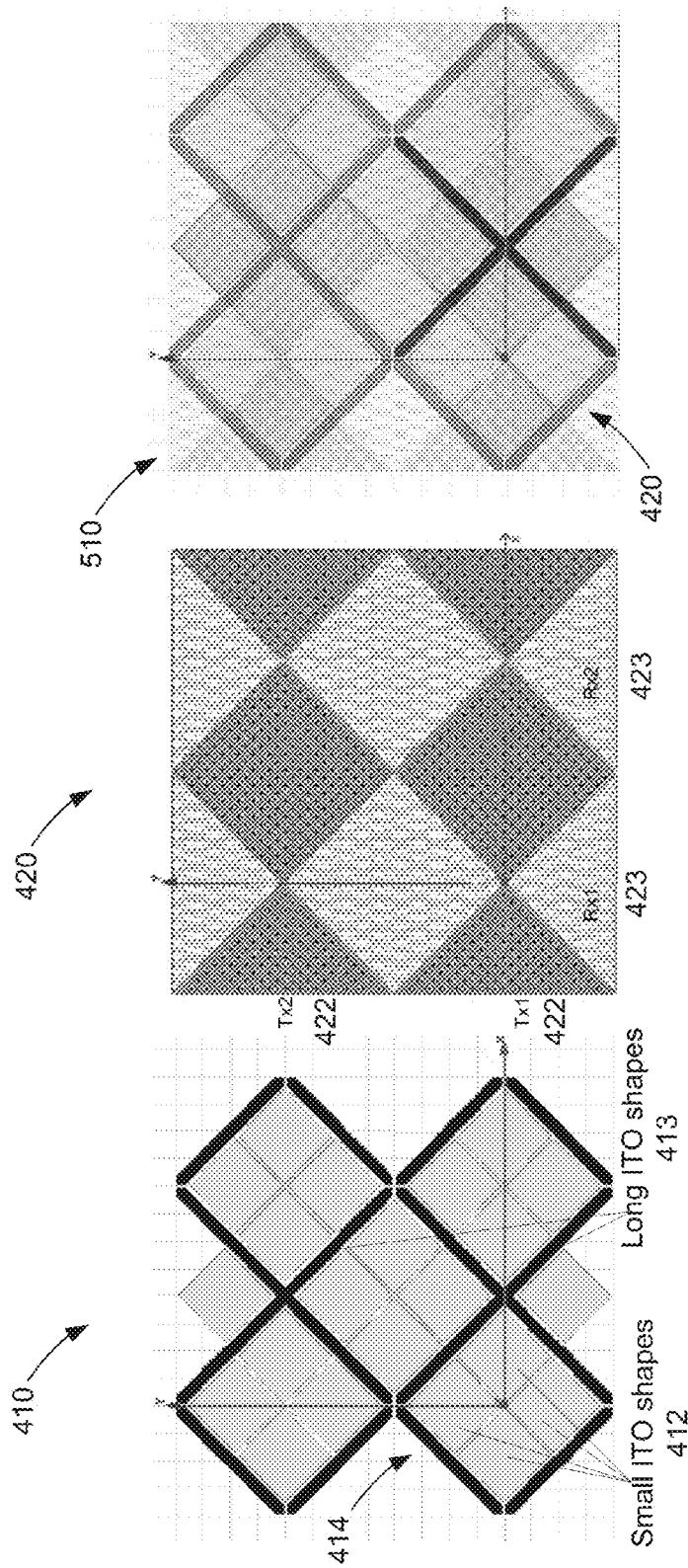

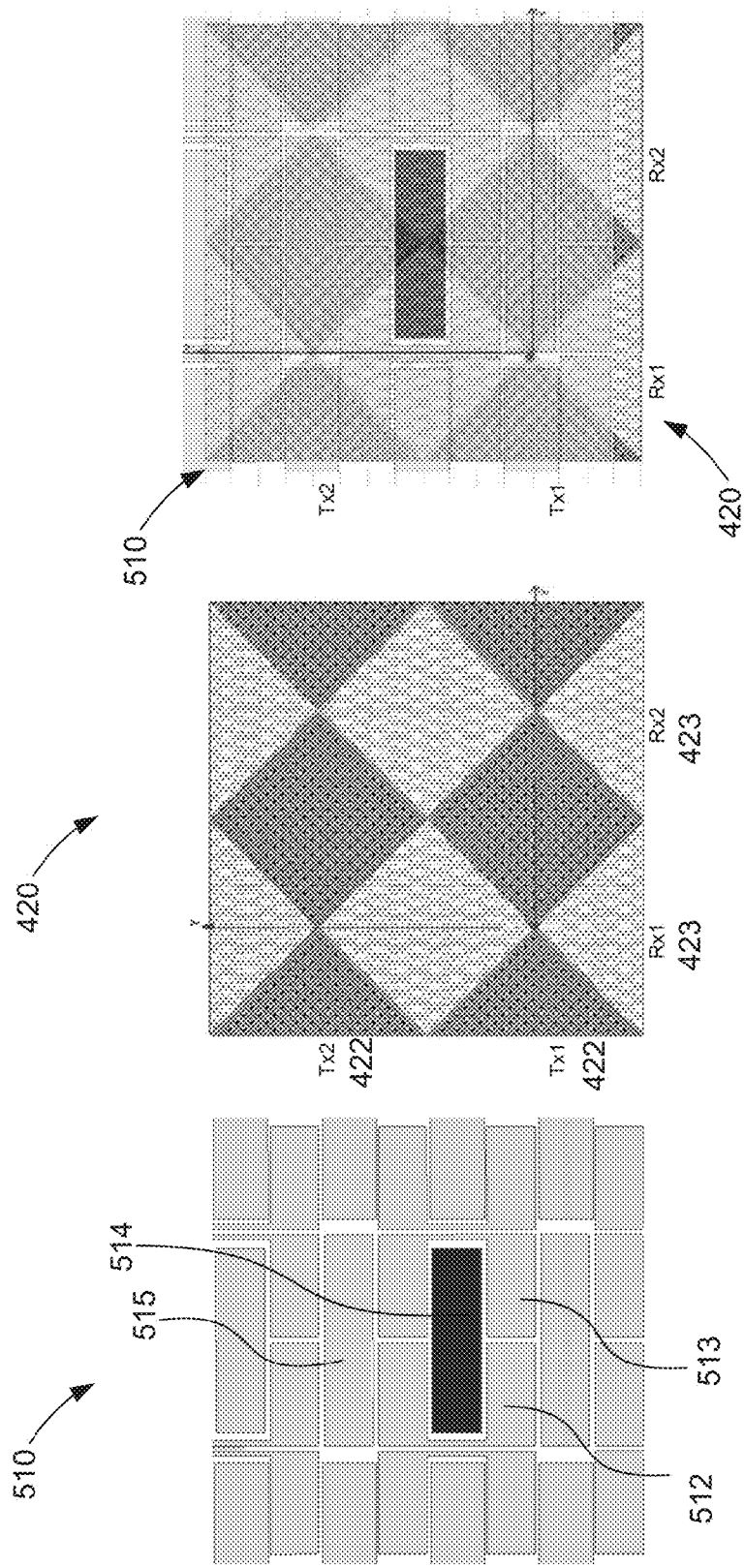

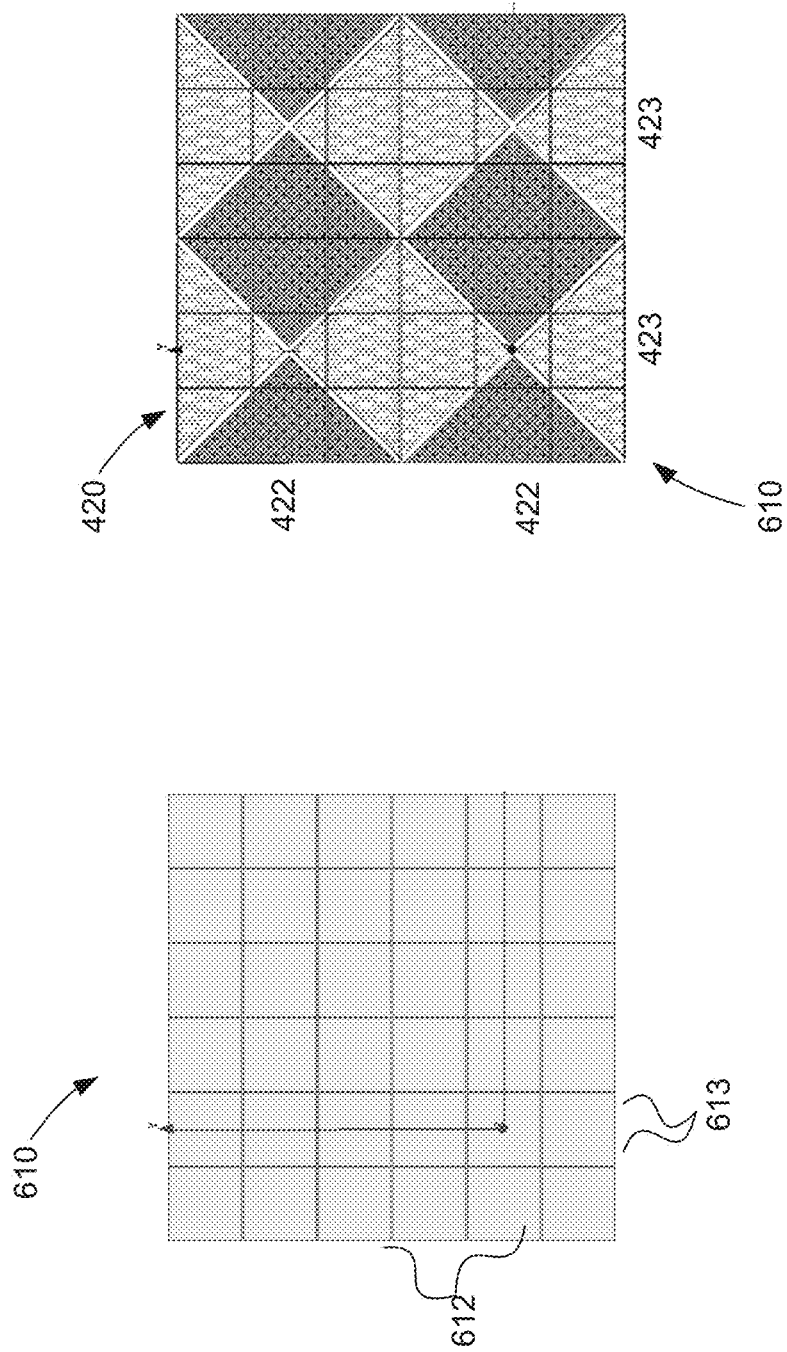

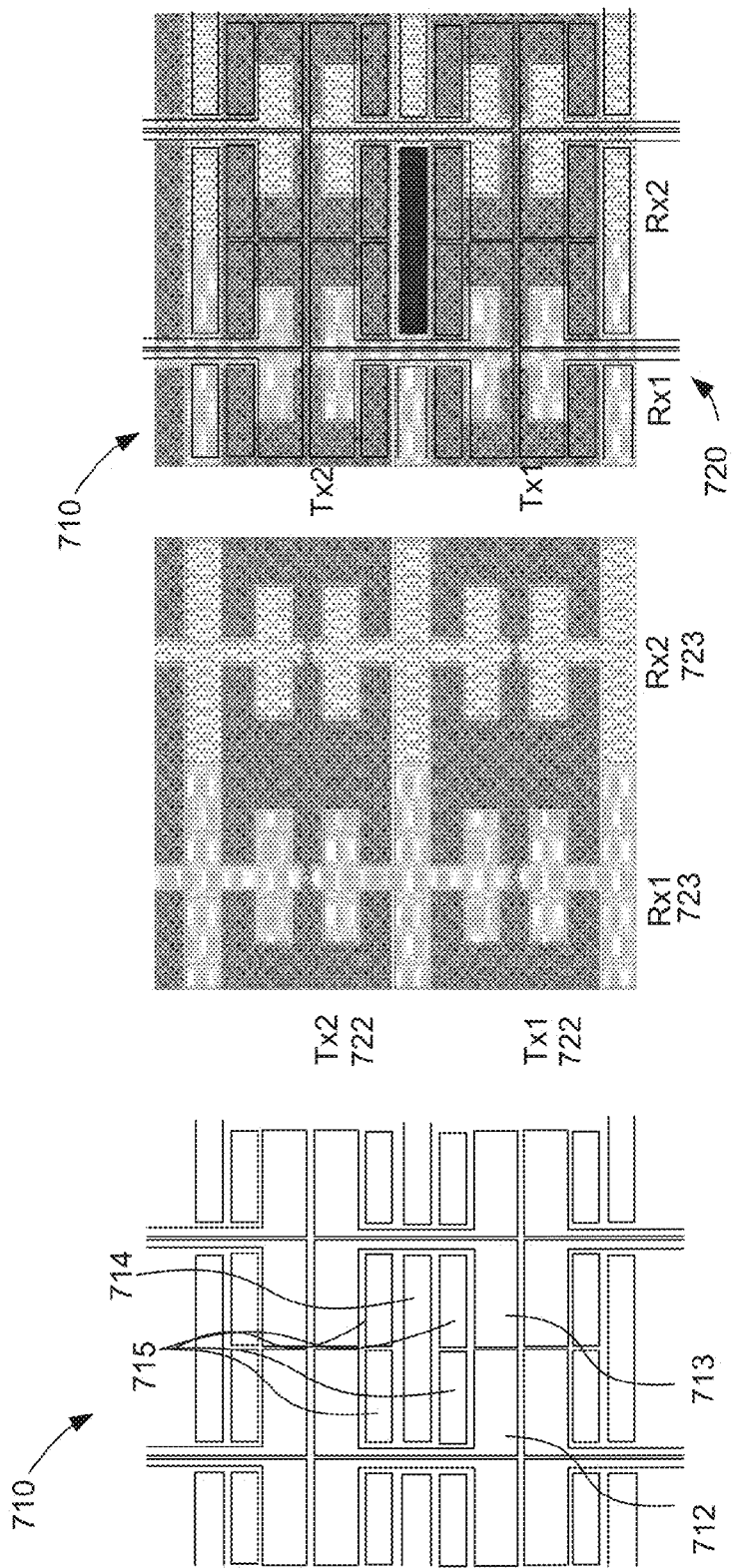

FIELD-LINE REPEATER (FLR) STRUCTURE OF A SENSE ARRAY

RELATED APPLICATIONS

This application claims the benefit of U.S. Provisional Application No. 61/816,442, filed Apr., 26, 2013, the entire contents of which are incorporated by reference herein.

TECHNICAL FIELD

The present disclosure relates generally to sensing systems, and more particularly to capacitance-sensing systems configurable to determine touch locations of touches on the capacitive-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and Cypress' touch solutions sense both capacitances either uniquely or in hybrid form with its various sense modes.

BRIEF DESCRIPTION OF THE DRAWINGS

The present invention is illustrated by way of example, and not of limitation, in the figures of the accompanying drawings.

FIG. 4A illustrates a top view of a first FLR structure including a first set of floating electrodes arranged in a diamond shape and a second set of floating electrodes comprising a first bar electrode and a second bar electrode according to one embodiment.

FIG. 4B illustrates a top view of multiple diamond-shaped electrodes disposed in multiple rows and multiple columns according to one embodiment.

FIG. 4C illustrates a top view of the first FRL structure disposed above the multiple diamond-shaped electrodes according to one embodiment.

FIG. 5A illustrates a top view of a second FLR structure with multiple floating electrodes including a first u-shape electrode, a second u-shape electrode, a first bar electrode and a second bar electrode according to one embodiment.

FIG. 5B illustrates a top view of multiple diamond-shaped electrodes disposed in multiple rows and multiple columns according to one embodiment.

FIG. 5C illustrates a top view of the second FRL structure disposed above the multiple diamond-shaped electrodes according to one embodiment.

FIG. 6A illustrates a top view of a third FLR structure including a first set of lines and a second set of lines for floating electrodes according to one embodiment.

FIG. 6B illustrates a top view of the third FLR structure disposed above the multiple diamond-shaped electrodes according to one embodiment.

FIG. 7A illustrates a top view of a fourth FLR structure with multiple floating electrodes including a first u-shape electrode, a second u-shape electrode and multiple bar electrodes according to one embodiment.

FIG. 7B illustrates a top view of multiple totem-pole electrodes and interlocking electrodes according to one embodiment.

FIG. 7C illustrates a top view of the fourth FRL structure disposed above the totem-pole electrodes according to one embodiment.

DETAILED DESCRIPTION

Figure 1:
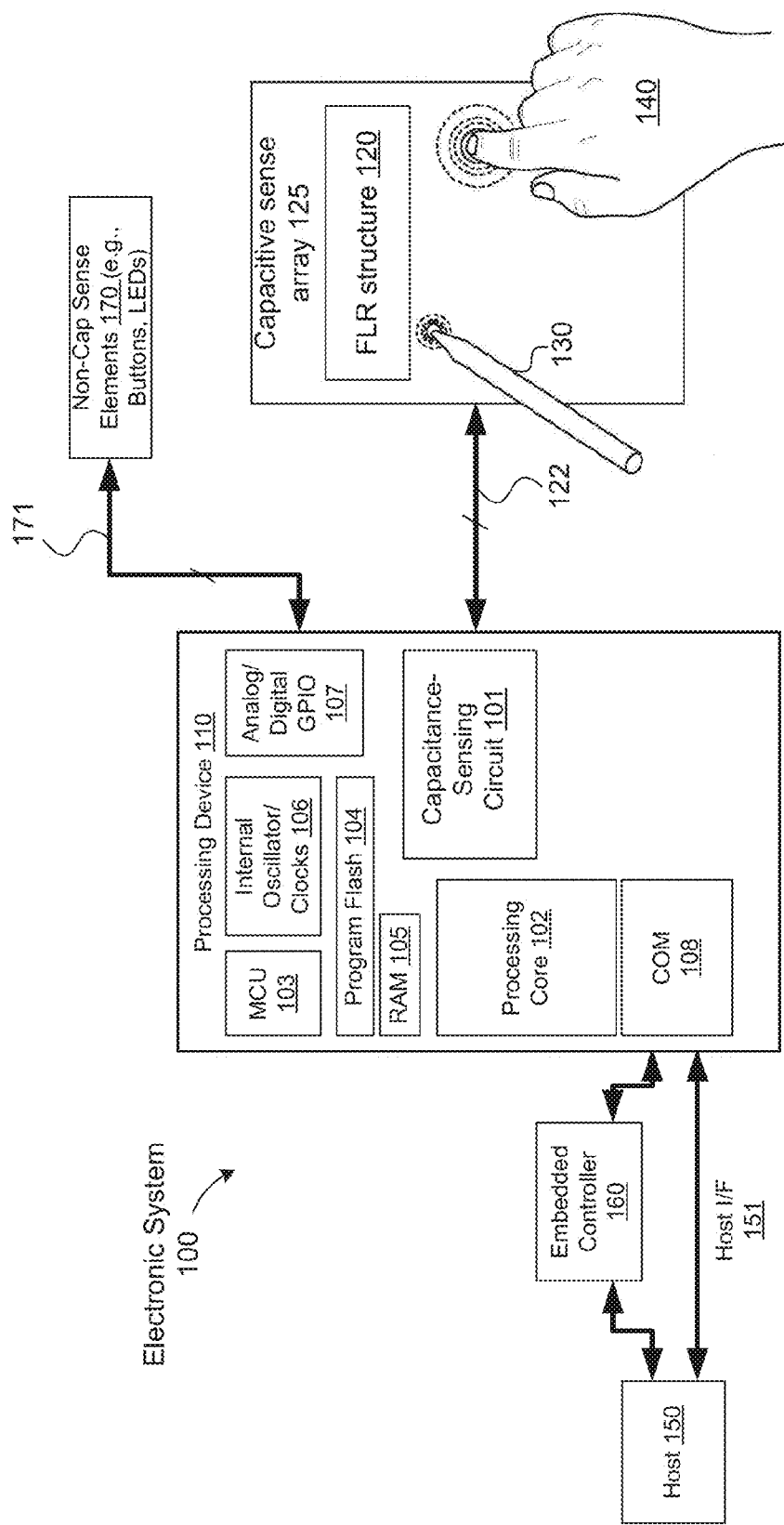
FIG. 1 is a block diagram illustrating one embodiment of an electronic system having a processing device coupled to a capacitance-sensing array with a field-line repeater (FLR) structure according to one embodiment.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Apparatuses and methods of field-line repeater structures for sense arrays are described. One apparatus includes a substrate, a capacitive-sense array with electrodes disposed on one or more sides of the substrate in one or more layers and a protective cover layer disposed to cover the capacitive-sense array. A coating film is disposed over the protective cover layer and a field-line repeater (FLR) structure of floating electrodes is disposed between the coating film and the protective cover layer.

Spatial accuracy of a passive stylus with existing sense elements (also referred to as a sensor cell) is limited because of low signals in the sensor cell under the passive stylus (cells i−1, i and i+1). Because of low sensitivity, it is challenging to use a passive stylus for hand writing in a small screen on a device, such as a 10×15 mm box on a screen. Many touch-screen applications utilize a coating film, such as an Anti-Shatter (AS) coating film, laminated on a glass cover for safety reasons. The embodiments described herein are directed to FLR structures disposed between the coating film and a protective cover layer, such as between the AS coating film and the glass cover. The FLR structure may include floating indium tin oxide (ITO) electrodes disposed between the cover glass and the AS film. For example, ITO patches can be deposited on a bottom face of the AS film or on a top face of the glass cover. The ITO electrodes may be arranged to form the FLR structure in the AS film layer. The function of the FLR is to magnify capacitive coupling between the sense elements (e.g., TX/RX electrodes) and a touch object (e.g., a finger, a passive stylus, or the like). That is, a FLR is a structure of conductive material, such as a floating patch of metal, that increase coupling between a narrow touch object and the sensing electrodes (RX electrodes) of the sense array. For example, a narrow touch object may be a 1.7 mm stylus or a 2 mm stylus and a regular touch object may be 7 mm or larger. The embodiments described herein can provide an improved touchscreen by improving sensitivity of measurements for sensing touch objects and by providing better positional accuracy. The embodiments described herein can enable a touchscreen of a device, such as a tablet, to operate precisely with a passive stylus, as well as continue to operate with fingers or other conductive objects.

FIG. 1 is a block diagram illustrating one embodiment of an electronic system 100 having a processing device 110 coupled to a capacitance-sensing array 125 with a field-line repeater (FLR) structure 120 according to one embodiment. Details regarding the FLR structure 120 are described in more detail with respect to FIGS. 2-12. In one embodiment, the processing device 110 includes the capacitance-sensing circuit 101 measures capacitance on one or more sense elements of the capacitive sense array 125 coupled to the processing device 110. For example, the capacitance-sensing circuit 101 measures a mutual capacitance of an intersection between a transmit (TX) electrode and a receive (RX) electrode of the capacitive sense array 125. The capacitive sense array 125 may be various types of touch-sensing devices. The touch-sensing device includes a protective cover layer disposed to cover the sense array and a coating film disposed over the protective cover layer. The FLR structure 120 includes floating electrodes disposed between the coating film and the protective cover layer.

In a further embodiment, the capacitance-sensing circuit 101 includes a TX signal generator to generate a TX signal to be applied to the TX electrode and a receiver (also referred to as a sensing channel), such as an integrator, coupled to measure an RX signal on the RX electrode. In a further embodiment, the capacitance-sensing circuit includes an analog-to-digital converter (ADC) coupled to an output of the receiver to convert the measured RX signal to a digital value. The digital value can be further processed by the processing device 110, the host 150 or both. The FLR structure 120 can include electrodes disposed in various configurations illustrated and described below with respect to FIGS. 3A-8.

The processing device 110 is configured to detect one or more touches on a touch-sensing device, such as the capacitive sense array 125. The processing device can detect conductive objects, such as touch objects 140 (fingers or passive styluses, an active stylus 130, or any combination thereof. The capacitance-sensing circuit 101 can measure touch data on the capacitive sense array 125. The touch data may be represented as multiple cells, each cell representing an intersection of sense elements (e.g., electrodes) of the capacitive sense array 125. In another embodiment, the touch data is a 2D capacitive image of the capacitive sense array 125. In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configurable to allow the capacitive-sensing circuit 101 to measure self-capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configurable to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configurable to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configurable to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102. The processing core 102 is a processing element configured to execute instructions or perform operations. The processing device 110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 102. In the case of the memory being external to the processing device, the processing device is coupled to the other device in which the memory resides as would be appreciated by one of ordinary skill in the art having the benefit of this disclosure.

The processing device 110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configurable to measure capacitance using mutual-capacitance sensing techniques, self-capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 125 are configurable to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 101 does not use mutual-capacitance or self-capacitance sensing to measure capacitances of the sense elements when performing a stylus sensing. Rather, the capacitance-sensing circuit 101 measures a charge that is capacitively coupled between the sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

The capacitance-sensing circuit 101 includes the FLR structure 120. Additional details of the FLR structure 120 are described below with respect to FIGS. 2-14B.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configurable to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2A:
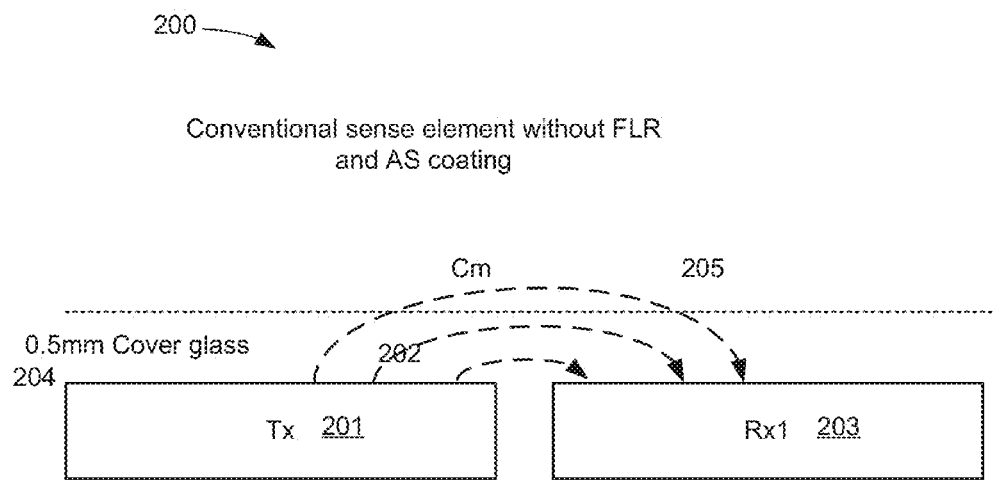
FIG. 2A illustrates two electrodes in a sense element of a conventional sense array according to one implementation.

FIG. 2A illustrates two electrodes in a sense element of a conventional sense array according to one implementation. In this implementation, the sense element 200 is an intersection of a TX electrode 101 and a RX electrode 103. A TX signal is applied to the TX electrode 101. When at a high potential, the TX electrode 101 produces an electric field 202 in a surrounding space. Part of electric field flux reaches the RX electrode 203. Most of the field flux passes via a glass cover 204. A small portion of the field flux passes through air above the cover glass 204 and returns back through the cover glass 204 to RX electrode 203. A portion 205 of the field 202 can be interrupted as a touch object, such as the stylus 206 of FIG. 2B, when the touch object is proximate to the cover glass 204.

Figure 2B:
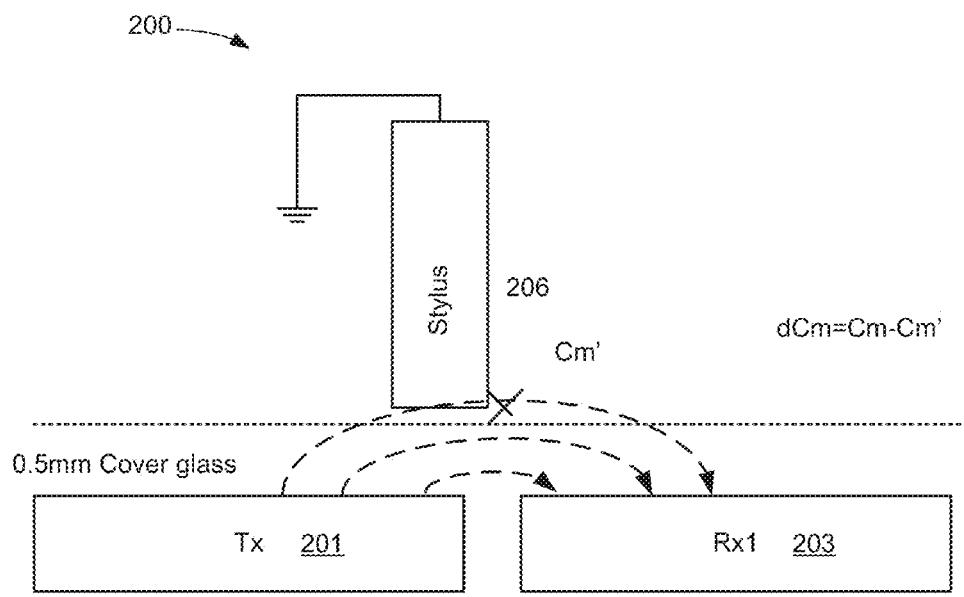
FIG. 2B illustrates a stylus in proximity to the conventional sense array of FIG. 2A according to one implementation.

FIG. 2B illustrates a stylus 206 in proximity to the conventional sense array 200 of FIG. 2A according to one implementation. A portion 205 of the field 202 can be interpreted and the change of the field flux is measured as a change in capacitance, dCM (e.g., dCM=Cm−Cm'). However, when a diameter of stylus 206 (e.g., 2 mm) is smaller than a pitch or width of the electrodes 201, 202 (e.g., 4.7 mm), then the sensitivity of the RX electrode 23 is low as described herein.

Figure 3A:
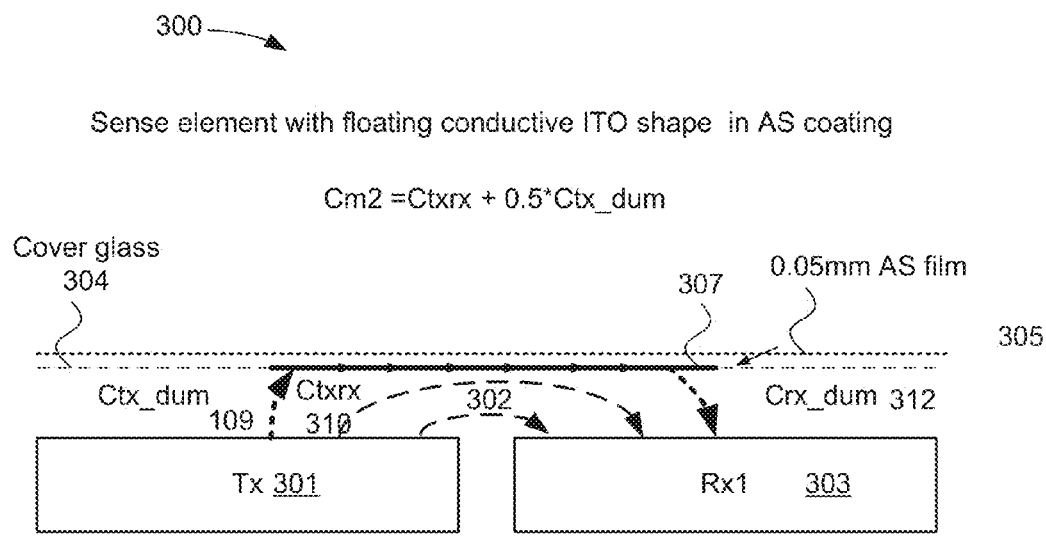
FIG. 3A illustrates two electrodes and a FLR structure in a sense element of a sense array according to one embodiment.

FIG. 3A illustrates two electrodes and a FLR structure in a sense element of a sense array according to one embodiment. In this embodiment, the sense element 300 is an intersection of a TX electrode 301 and a RX electrode 303. A protective cover layer 304 (e.g., cover glass) is disposed to cover the TX electrode 301 and the RX electrode 303. A coating film 305 (e.g., AS film) is disposed over the protective cover layer 304. A FLR structure, including a floating conductive ITO patch 307, disposed in or below the coating film 305. The ITO patch is situated close to a surface of the sense element 300 so that it has a larger coupling with any touch object proximate to the conductive ITO patch 307.

A TX signal is applied to the TX electrode 301. When at a high potential, the TX electrode 301 produces an electric field 302 in a surrounding space. A capacitance 310 (Ctx_dum) is formed between the TX electrode 301 and the ITO patch 307 and a capacitance 312 (Crx_dum) is formed between RX electrode 303 and ITO patch 307. The electric field flux goes through the protective cover layer 304 to the ITO patch 307 and then travels horizontally along the ITO patch 307 and returns back through the protective cover layer 304 towards the RX electrode 303. In other words, a serial network of Ctx_dum 310 and Crx_dum 312 is added to a mutual capacitance Cm between the TX electrode 301 and RX electrode 303.

Figure 3B:
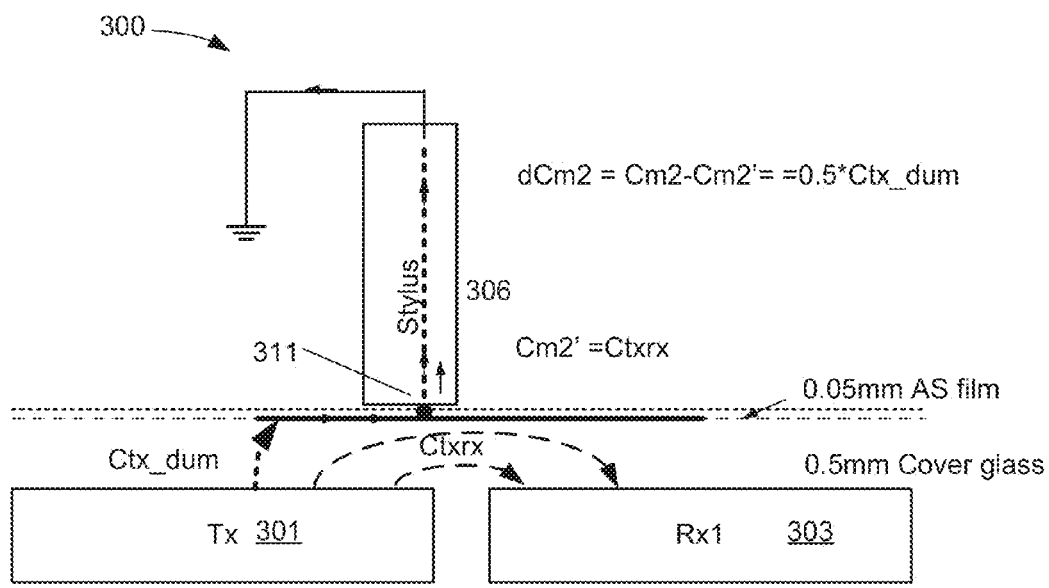
FIG. 3B illustrates a stylus in proximity to the sense array of FIG. 3A according to one embodiment.

FIG. 3B illustrates a stylus 306 in proximity to the sense array of FIG. 3A according to one embodiment. When the stylus 306 is placed proximate to the sense element 300 a large coupling is formed with the ITO patch 307 at point 311 above the sensor it forms large coupling with ITO patch at point 111. In the case of a grounded stylus, electric current in the ITO patch 307 is diverter to ground, as shown in FIG. 3B. As a result, the flux-current path via the ITO patch 307 is interrupted and this portion of the flux does not reach the RX electrode 303. In effect, the mutual capacitance Cm changes for dCm2=Ctx_dum Ctx_dum/(Ctx_dum+Ctx_dum). If Ctx_dum=Ctx_dum, then dCm2=0.5*Ctx_dum.

In one embodiment, the protective cover layer 304 includes glass. In another embodiment, the protective cover layer 304 includes plastic. In a further embodiment, the coating film 305 is at least one of an anti-shatter (AS) coating film, an anti-glare (AG) coating film or a scratch resistance film. Alternatively, other coating films may be used. The floating electrodes may be ITO patches as set forth in FIGS. 3A and 3B. In other embodiment, the floating electrodes may be other types of electrodes. Various dimension and shapes of the FLR structure can be used to make the sense element 300 be more stylus friendly than conventional sense element 200. In another embodiment, the protective cover layer, coating film and the floating electrodes are transparent. The protective cover layer can be manufactured using various techniques, such as applying the material as liquid, gas or solids. The coating film can be disposed using various techniques as well. The floating electrodes can be disposed within, under, or between the coating film and the protective cover layer.

In another embodiment, a touch-sensing device includes a substrate, a capacitive-sense array comprising multiple electrodes disposed on a first side of the substrate and a field-line repeater structure comprising multiple floating electrodes disposed on a second side of the substrate.

In another embodiment, a touch-sensing device includes a capacitive-sense array including multiple electrodes disposed in a first layer. The touch-sensing device also includes a second layer of material to cover the capacitive-sense array and a third layer of material disposed over the second layer. The touch-sensing device includes a field-line repeater structure including multiple floating electrodes disposed between the second layer and the third layer. In one embodiment, the second layer is a protective cover layer and the third layer is a coating film disposed over the protective cover layer.

FIG. 4A illustrates a top view of a first FLR structure 410 including a first set of floating electrodes 412 arranged in a diamond shape 414 and a second set of floating electrodes 413 comprising a first bar electrode and a second bar electrode according to one embodiment. The first FLR structure 410 can be laminated on a solid diamond sense element pattern, illustrated in FIG. 4B.

FIG. 4B illustrates a top view of multiple diamond-shaped electrodes 420 disposed in multiple rows 422 and multiple columns 423 according to one embodiment. In this embodiment, multiple TX electrodes are diamond-shape electrodes disposed in the multiple rows 422 and multiple RX electrodes are diamond-shape electrodes disposed in the multiple columns 423.

FIG. 4C illustrates a top view of the first FRL 410 structure disposed above the multiple diamond-shaped electrodes 420 according to one embodiment.

In these embodiments, the floating electrodes include the first set of floating electrodes 412 (labeled small ITO shapes). The first set 412 are arranged in a diamond shape 414 and are disposed to overlap portions of at least two of the diamond-shape electrodes in a first row 422 and to overlap portions of at least two of the diamond-shape electrodes in a first column 423. The floating electrodes may also include the second set of floating electrodes 413 (labeled long ITO shapes). The second set 413 includes a first bar electrode that overlaps a first portion of a first diamond-shape electrode in the first column 423 and a second portion of a second diamond-shape electrode in a second column 423. The second set 413 also includes a second bar electrode that overlaps a third portion of a third diamond-shape electrode in the first column 423 and a fourth portion of a fourth diamond-shape electrode in the second column 423. The first bar electrode and the second bar electrode intersect over a fifth diamond-shape electrode in the first row 422. The pattern of the first set 412 and the second set 413 can be repeated over multiple columns and multiple rows.

In another embodiment, the floating electrodes of the first FRL structure 410 are squares and long cross shapes, which extend above the next sensing cell. The sense elements are single solid diamond (SSD) sensing electrodes. It should also be noted that the embodiments of FIGS. 4A-4D illustrate a 2×2 sense array, but the sense array can have more than two rows and more than two columns, or both.

Figure 4D:
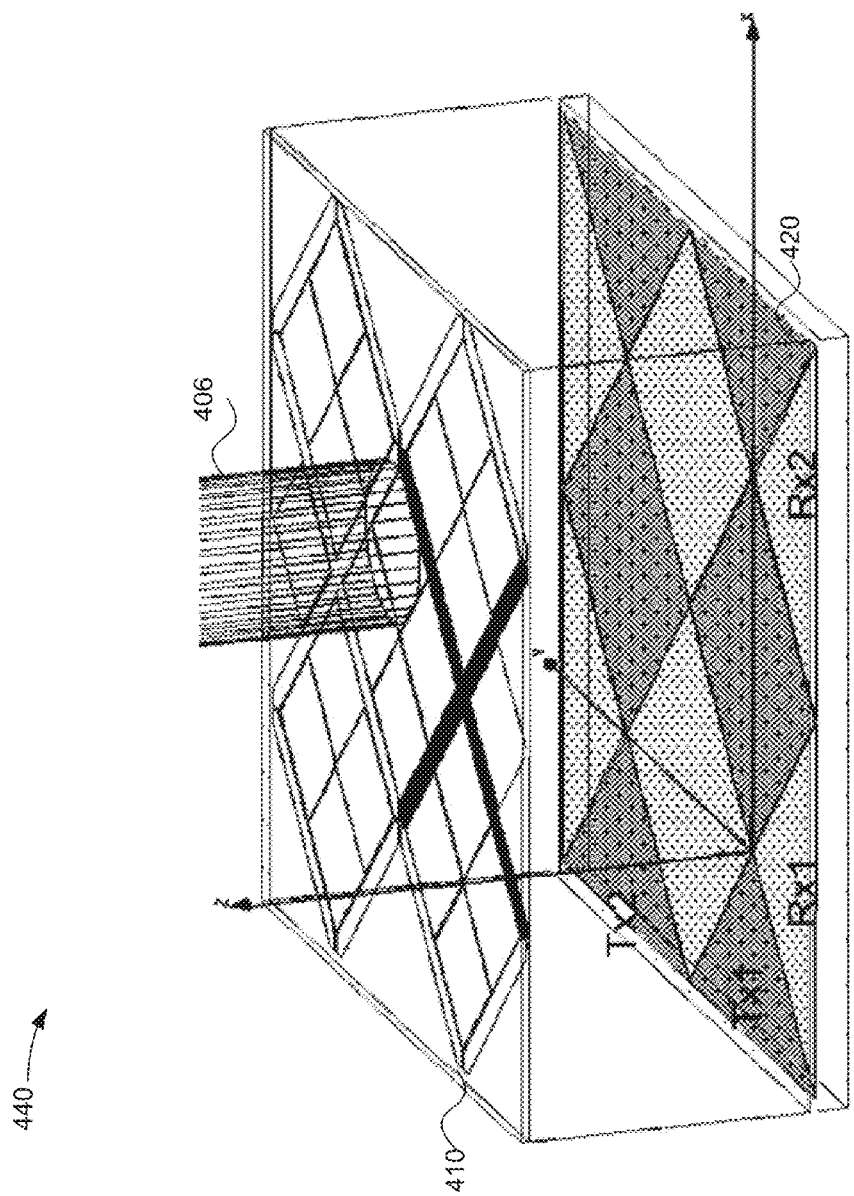
FIG. 4D illustrates a perspective view of a stack-up of a sense array with the first FRL structure and the multiple diamond-shaped electrodes according to one embodiment.

FIG. 4D illustrates a perspective view of a stack-up 440 of a sense array with the first FRL structure 410 and the multiple diamond-shaped electrodes 420 according to one embodiment. It should be noted that a distance between the first FRL structure 410 and the sense array is not drawn to scale, but has been lengthened to show the two layers. FIG. 4D also illustrates a column that represents a stylus 406 proximate to the first FRL structure 410 to be detected by the electrodes 420.

FIG. 4D show a 3D view of the SSD sense elements with FLR 410 above. The SSD sense elements with FLR 410 detect the stylus 406 (e.g., 1.7 mm stylus) above the sense array. One of the floating electrodes of the second set 413 is highlighted as a cross that extends over several cells of the sensing layer. The cross effectively links the center of the RX electrodes, RX1 and RX2, so that any objected placed above RX1 affects the field to RX2, and vice-versa.

Stylus is placed above Tx1Rx2 electrode intersection (unit cell). Due to highlighted cross, stylus couples to Rx1 electrode. As a result, significant dCm signal is produced not only in Tx1Rx2 cell, but also in Tx1Rx1 cell.

These embodiments of the FLR structure can make the sense element much more stylus friendly than conventional sense arrays. In one embodiment, the monotonic dCm profile is obtained for width of the cross, as expressed in the following: a=0.05*pitch*sqrt(2)=0.28 mm, where pitch is the period of electrodes equal 4 mm.

It should be noted that the application of FLR structures is not limited to TX-RX measurement modes. The FLR structures can be used for self-capacitance measurement modes a swell. For self-capacitance measurement modes, the FLR structure can have a different shape, such as the one shown in FIG. 5A-5D.

FIG. 5A illustrates a top view of a second FLR structure 510 with multiple floating electrodes including a first u-shape electrode 512, a second u-shape electrode 513, a first bar electrode 514 and a second bar electrode 515 according to one embodiment.

FIG. 5B illustrates a top view of multiple diamond-shaped electrodes 420 disposed in multiple rows and multiple columns according to one embodiment. FIG. 5B is similar to FIG. 4B.

FIG. 5C illustrates a top view of the second FRL structure 510 disposed above the multiple diamond-shaped electrodes 420 according to one embodiment.

In these embodiments, the floating electrodes multiple electrodes 512-514. The first u-shape electrode 512 is disposed in a first orientation to overlap portions of a first electrode in a first column 423, a second electrode in a first row 422 and a third electrode in a second row 422. The second u-shape electrode 513 is disposed in a second orientation to overlap portions of a fourth electrode in a second column 423, the second electrode in the first row 422 and the third electrode in the second row 422. The second orientation is an opposite orientation of the first orientation and the first u-shape electrode 512 and second u-shape electrode 513 form an opening. The first bar electrode 514 is disposed within the opening. The first bar electrode 514 is to overlap portions of the first electrode in the first column 423 and the fourth electrode in the second column 423. In another embodiment, the first bar electrode 514 is disposed to further overlap the second electrode in the first row 422 and the third electrode in the second row 422. The second bar electrode 515 is disposed adjacent to one side (e.g., above) of the two u-shaped electrodes 512, 513. The second bar electrode 515 is disposed to overlap portions of the first electrode in the first row 422, the second electrode in the first row 422, the fourth electrode in the second column 423, a fifth electrode in the first column 423 and a sixth electrode in the second column 423.

In a further embodiment, the pattern of 512-514 is repeated over more than two rows 422 and two columns 423.

Figure 5D:
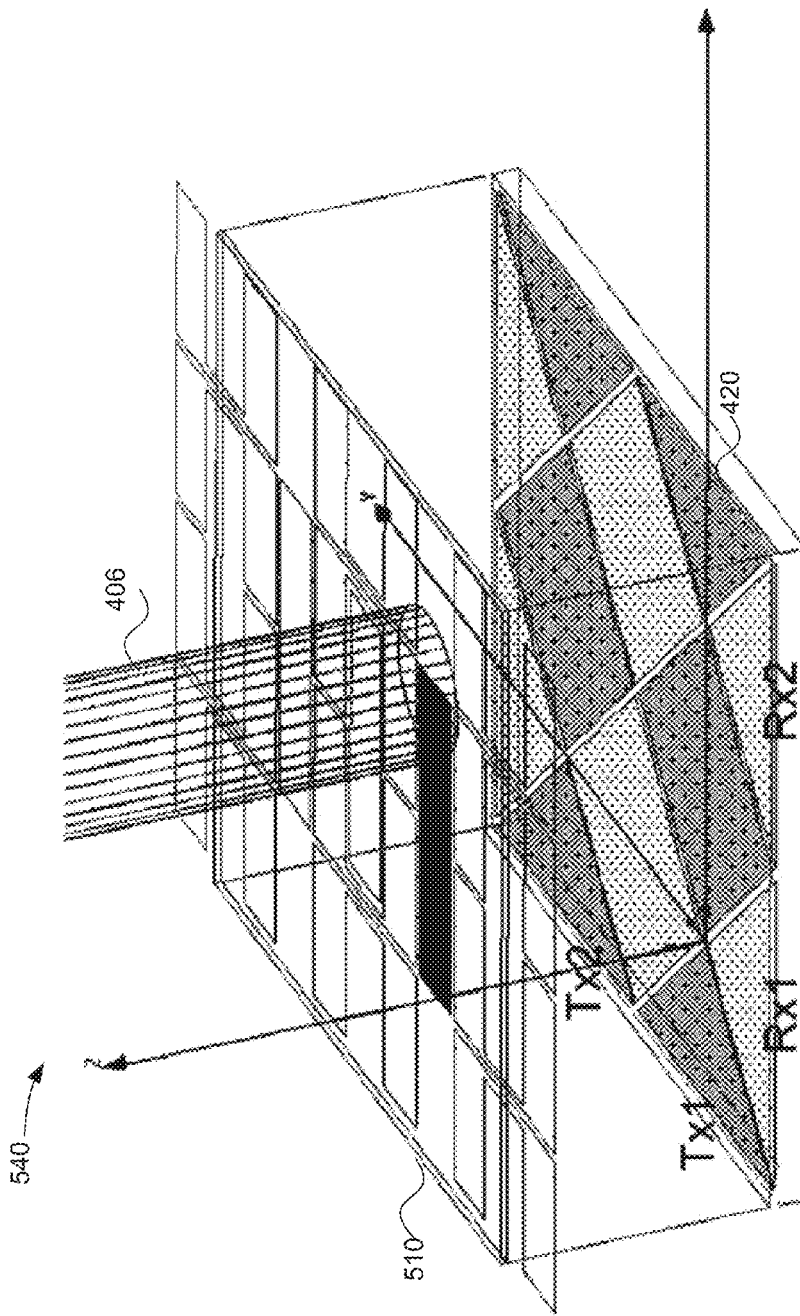
FIG. 5D illustrates a perspective view of a stack-up of a sense array with the second FRL structure and the multiple diamond-shaped electrodes according to one embodiment.

FIG. 5D illustrates a perspective view of a stack-up 540 of a sense array with the second FRL structure 510 and the multiple diamond-shaped electrodes 420 according to one embodiment. It should be noted that a distance between the second FRL structure 510 and the sense array is not drawn to scale, but has been lengthened to show the two layers. FIG. 5D also illustrates a column that represents a stylus 406 proximate to the second FRL structure 510 to be detected by the electrodes 420.

FIG. 6A illustrates a top view of a third FLR structure 610 including a first set of lines 612 and a second set of lines 613 for floating electrodes according to one embodiment. FIG. 6B illustrates a top view of the third FLR structure 610 disposed above the multiple diamond-shaped electrodes 420 according to one embodiment.

Figure 6C:
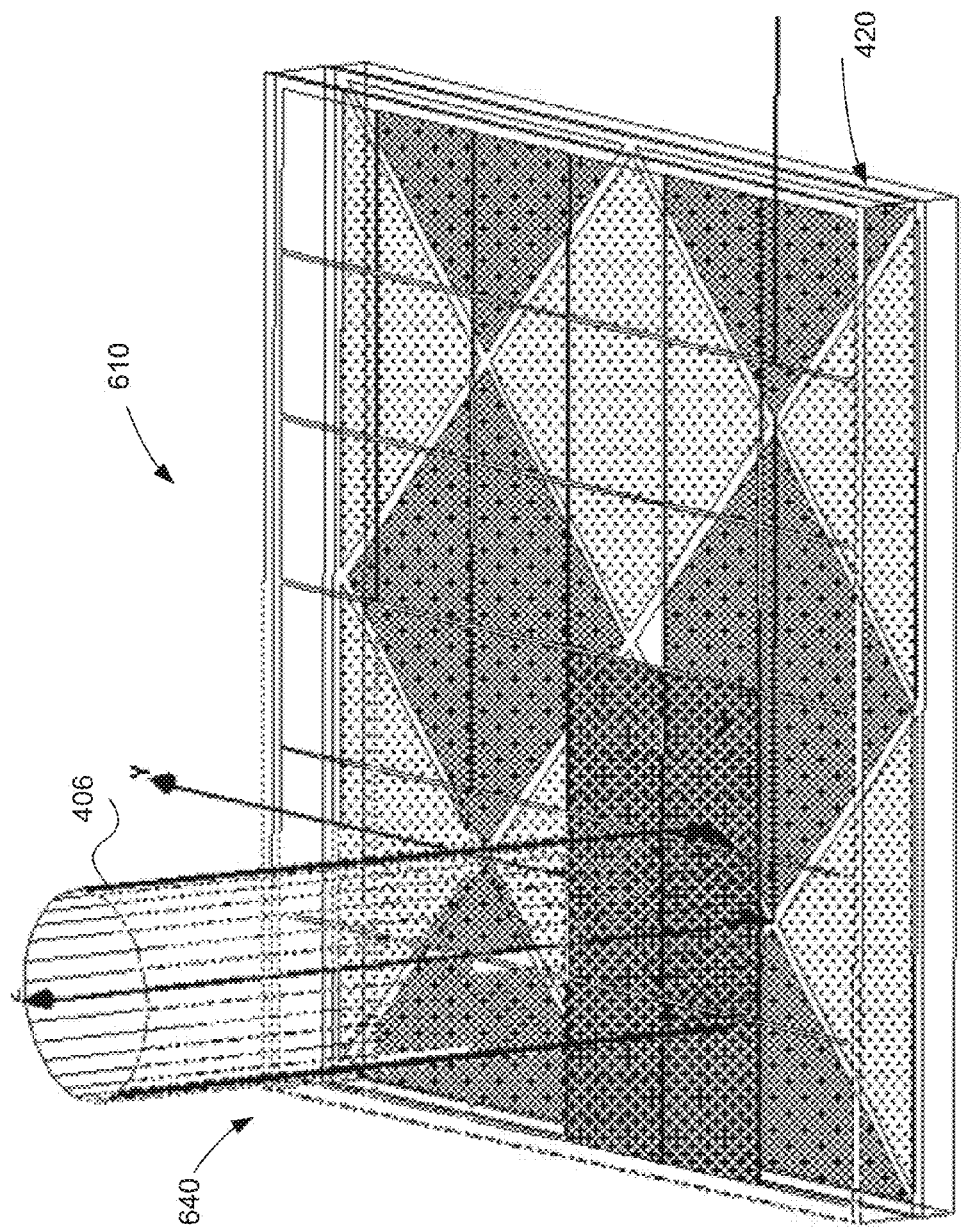
FIG. 6C illustrates a perspective view of a stack-up of a sense array with the third FRL structure and the multiple diamond-shaped electrodes according to one embodiment.

FIG. 6C illustrates a perspective view of a stack-up 640 of a sense array with the third FRL structure 610 and the multiple diamond-shaped electrodes 420 according to one embodiment. It should be noted that a distance between the third FRL structure 610 and the sense array is not drawn to scale, but has been lengthened to show the two layers. FIG. 6D also illustrates a column that represents a stylus 406 proximate to the third FRL structure 610 to be detected by the electrodes 420. FIG. 6C shows how coupling of the stylus 406 to sensing electrodes can be extended by the FLR structure 610.

The FLR structures described herein can be implemented in touchscreens having AS coating layer on top of the cover glass. These touchscreens can implement conductive ITO patches in the AS coating layer. The shape and arrangement of the conductive ITO patches can be designed to the corresponding shapes of the sense electrodes. The shape and arrangement of the FLR structures may be different, and may depend on the shape and arrangement of the sensing electrodes. The thinner the AS coating layer, the better the conductive ITO patches can operate. For another example, a fourth FLR structure 710 in FIG. 7A for a totem pole sense element in a TX-RX measurement mode.

It should also be noted that different sensing electrodes shapes and arraignments can be used, such as illustrated in FIGS. 7A-7D.

FIG. 7A illustrates a top view of a fourth FLR structure 710 with multiple floating electrodes including a first u-shape electrode 712, a second u-shape electrode 713 and multiple bar electrodes 714, 715 according to one embodiment.

FIG. 7B illustrates a top view of multiple totem-pole electrodes 722 and interlocking electrodes 723 according to one embodiment. The totem-pole electrodes 722 are disposed in multiple rows and the interlocking electrodes 723 are disposed in columns.

FIG. 7C illustrates a top view of the fourth FRL structure 710 disposed above the totem-pole electrodes 722 and interlocking electrodes 723 according to one embodiment.

In these embodiments, the floating electrodes multiple electrodes 712-714. The first u-shape electrode 712 is disposed in a first orientation to overlap portions of a first electrode in a first column 723, a second electrode in a first row 722 and a third electrode in a second row 722. The second u-shape electrode 713 is disposed in a second orientation to overlap portions of a fourth electrode in a second column 723, the second electrode in the first row 722 and the third electrode in the second row 722. The second orientation is an opposite orientation of the first orientation and the first u-shape electrode 712 and second u-shape electrode 713 form an opening. The first bar electrode 714 is disposed within the opening. The first bar electrode 714 is to overlap portions of the first electrode in the first column 723 and the fourth electrode in the second column 723. Additional rectangular electrodes 715 are also disposed within the opening formed by the first u-shape electrode 712 and the second u-shape electrode 713. In another embodiment, the first bar electrode 714 is disposed to further overlap the second electrode in the first row 722 and the third electrode in the second row 722.

In a further embodiment, the pattern of the FLR structure 710, including electrodes 712-715, is repeated over more than two rows 722 and two columns 723.

Figure 8:
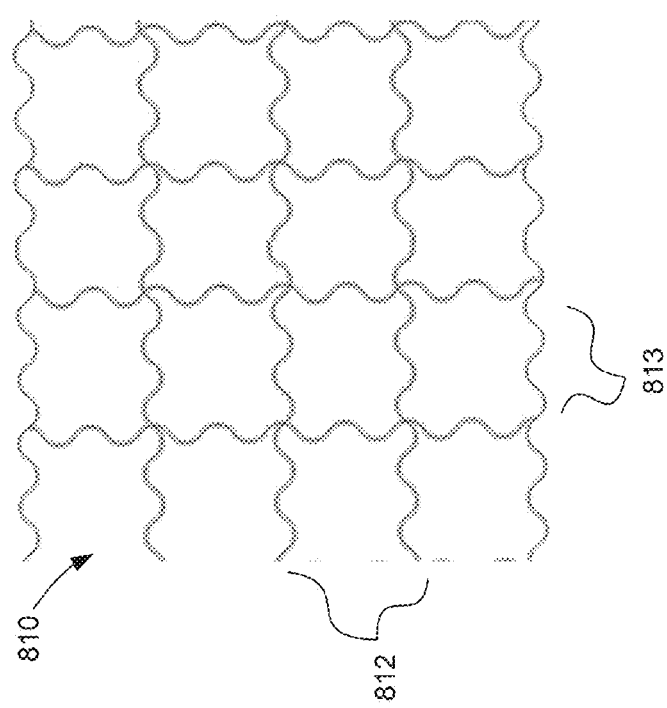
FIG. 8 illustrates a top view of a fifth FLR structure including a first set of curved lines and a second set of curved lines for the floating electrodes according to one embodiment.

The FLR structure can be small squares with narrow (e.g., less than 30 um) gap between them. In another embodiment, the FLR structure has wavy boundaries, as illustrated in FIG. 8. The wavy boundary may increase edge coupling between the floating electrodes of the FLR structure and effectively spreads signals from the stylus to larger area of sensing electrodes.

FIG. 8 illustrates a top view of a fifth FLR structure 810 including a first set of curved lines 812 and a second set of curved lines 813 for the floating electrodes according to one embodiment. In effect, the first set of curved lines 812 and second set of curved lines 813 can form waved-edge shapes. These waved-edge shapes can be disposed above different shapes of sensing electrodes as described herein.

Figure 9:
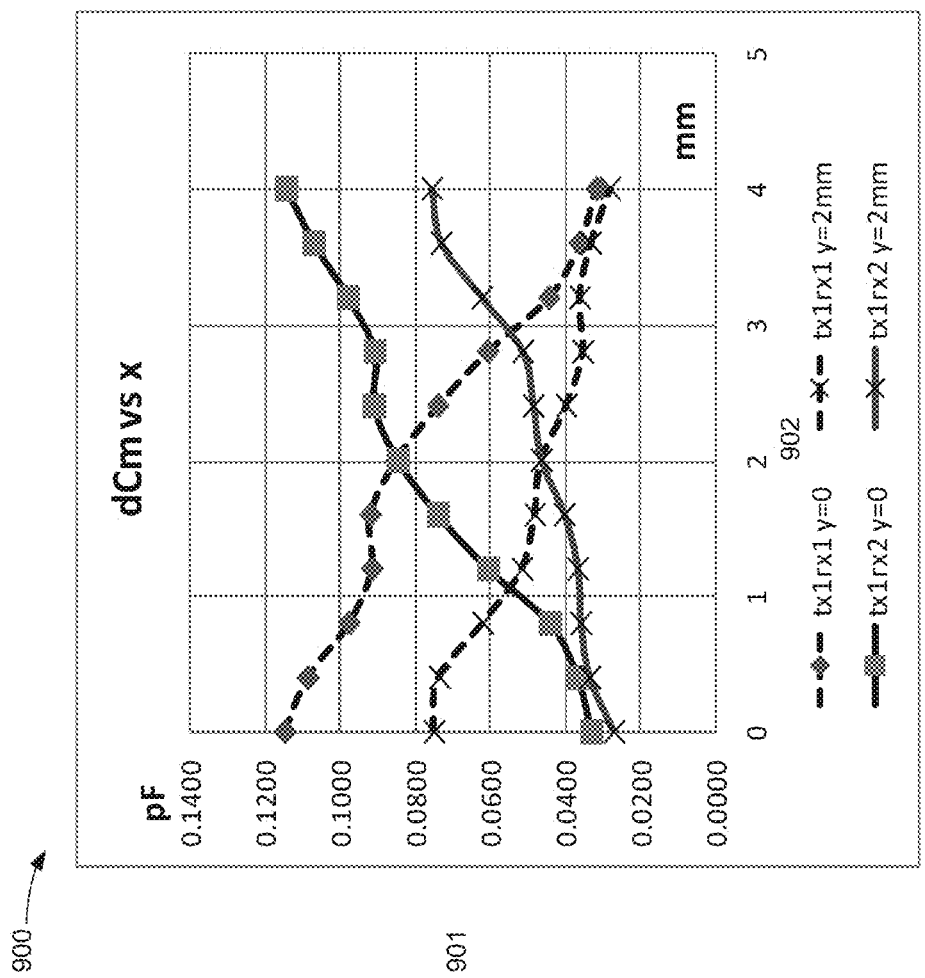
FIG. 9 is a graph illustrating a change in capacitance with respect to distance of the sense array of FIG. 5D according to one embodiment.

FIG. 9 is a graph 900 illustrating a change in capacitance 901 with respect to distance 902 of the sense array of FIG. 5D according to one embodiment. The graph 900 illustrates simulation results of the sense elements with FLR structure of FIG. 5D. The sense elements are scanned to get a mutual capacitance profile (dCm profile) with no "negative slope". A good profile was obtained at a=0.05*$pitch*sqrt(2)=0.28 mm. FIG. 9 shows the dCm profiles for 1.7 mm stylus moved from the cell Tx1Rx1 to the cell Tx1Rx2. Most notably, is the response in the neighboring cell has been increased to 27 fF, which is 24% of the response for stylus placed in the center of the cell. A dCm profile for the 1.7 mm stylus moved along the edge (at y=2 mm) is monotonically descending. The dCm profiles in FIG. 9 can be compared to dCm profiles of the traditional single solid diamond (SSD) and double solid diamond sense electrodes in FIGS. 10 and 11, respectively.

Figure 10:
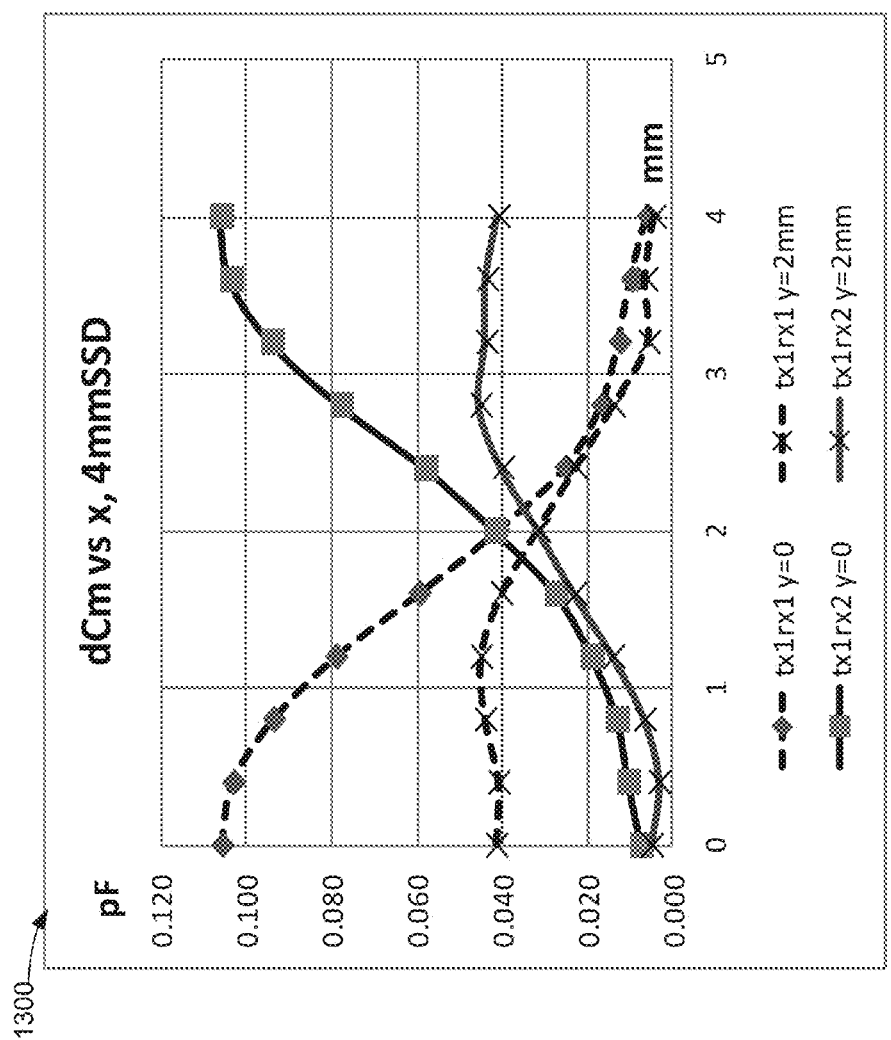
FIG. 10 is a graph illustrating a change in capacitance with respect to distance of a conventional sense array using a single solid diamond (SSD) layout according to one implementation.

FIG. 10 is a graph illustrating a change in capacitance with respect to distance of a conventional sense array using a single solid diamond (SSD) layout according to one implementation.

Figure 11:
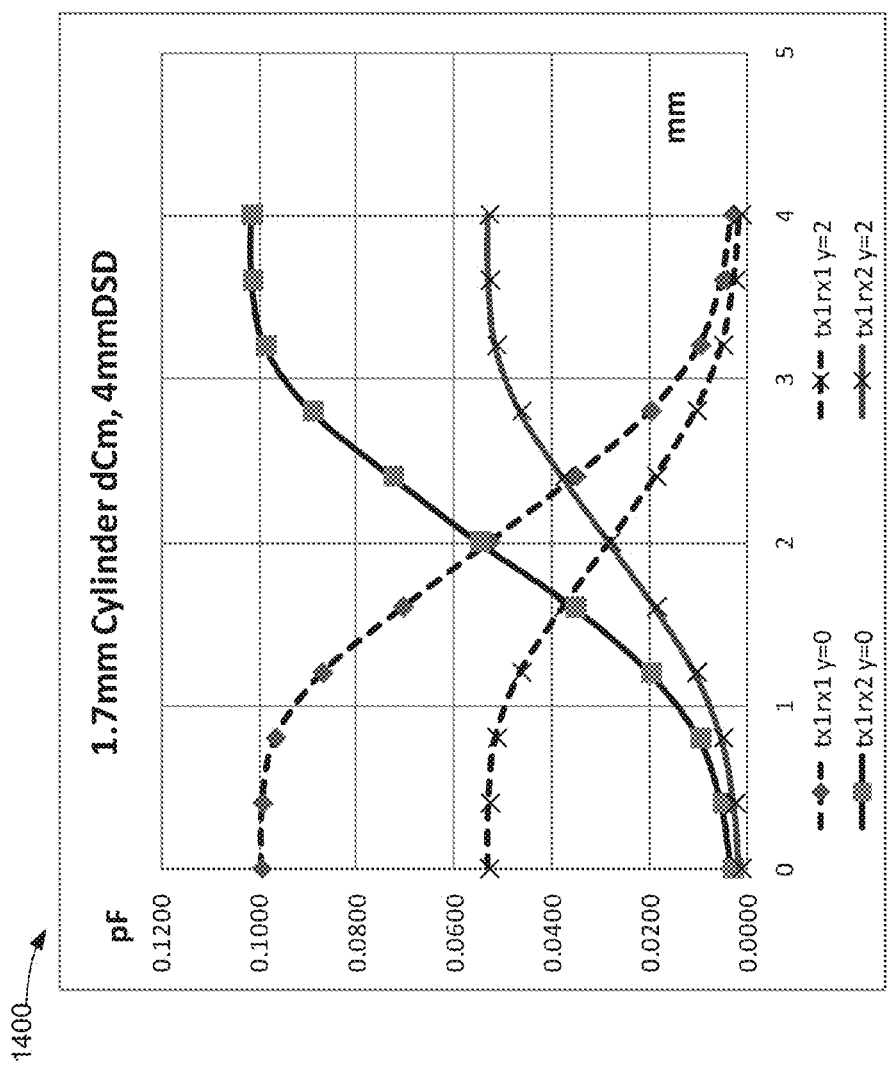
FIG. 11 is a graph illustrating a change in capacitance with respect to distance of a conventional sense array using a double solid diamond (DSD) layout according to one implementation.

FIG. 11 is a graph illustrating a change in capacitance with respect to distance of a conventional sense array using a double solid diamond (DSD) layout according to one implementation.

Figure 12:
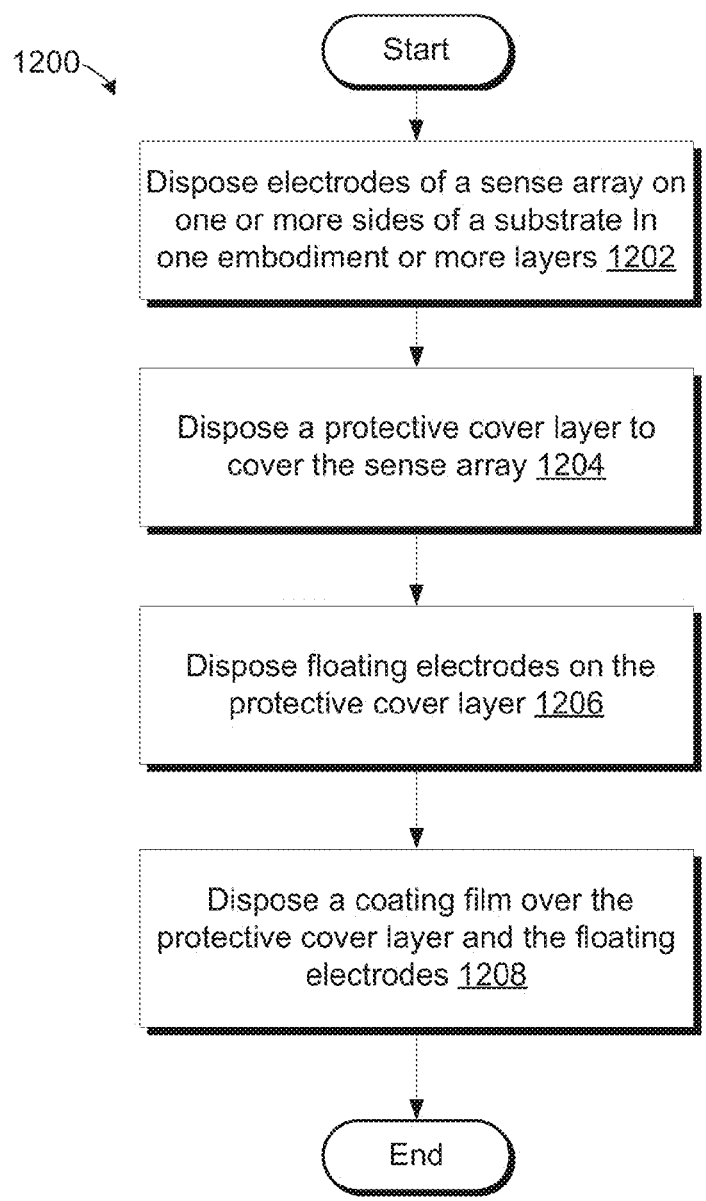
FIG. 12 is a flow diagram of a method of fabricating a sense array with a FLR structure according to an embodiment.

FIG. 12 is a flow diagram of a method 1200 of fabricating a sense array with a FLR structure according to an embodiment. The method 900 begins with disposing electrodes of a sense array on one or more sides of a substrate in one or more layers (block 1202). A protective cover layer is disposed to cover the sense array (block 1204) and multiple floating electrodes are disposed over the protective cover layer (block 1206). A coating film is disposed to over the protective cover layer and the multiple floating electrodes (block 1208).

In a further embodiment, the electrodes are diamond-shape electrodes and are arranged in columns and rows. A first set of floating electrodes are arranged in a diamond-shape and is disposed to o overlap portions of at least two of the diamond-shape electrodes in a first row and to overlap portions of at least two of the diamond-shape electrodes in a first column.

In a further embodiment, a second set of floating electrodes is disposed, the second set including a first bar electrode and a second bar electrode. The first bar electrode is disposed to overlap a first portion of a first diamond-shape electrode in the first column and a second portion of a second diamond-shape electrode in a second column. The second bar electrode is disposed to overlap a third portion of a third diamond-shape electrode in the first column and a fourth portion of a fourth diamond-shape electrode in the second column. The first bar electrode and the second bar electrode intersect over a fifth diamond-shape electrode in the first row.

In a further embodiment, the electrodes are arranged in rows and columns and the floating electrodes are disposed in relation to the rows and columns. The floating electrodes include: 1) a first u-shape electrode disposed in a first orientation to overlap portions of a first electrode in a first column, a second electrode in a first row and a third electrode in a second row; 2) a second u-shape electrode disposed in a second orientation to overlap portions of a fourth electrode in a second column, the second electrode in the first row and the third electrode in the second row. The second orientation is an opposite orientation of the first orientation and the first u-shape electrode and second u-shape electrode form an opening; 3) a first bar electrode disposed within the opening. The first bar electrode is disposed to overlap portions of the first electrode in the first column and the fourth electrode in the second column.

The method may also include disposing other FLR structures and electrodes as illustrated and described above with respect to FIGS. 1-8.

In one embodiment, the capacitive touch screen controller is the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touch-screens, supports leading operating systems, and is optimized for low-power multi-touch gesture and all-point touchscreen functionality. Alternatively, the touch position calculation features may be implemented in other touch-screen controllers, or other touch controllers of touch-sensing devices. In one embodiment, the touch position calculation features may be implemented with other touch filtering algorithms as would be appreciated by one of ordinary skill in the art having the benefit of this disclosure.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A touch-sensing device comprising:
   a capacitive-sense array comprising a plurality of electrodes disposed in a first layer;
   a second layer of material to cover the capacitive-sense array;
   a third layer of material disposed over the second layer; and
   a field-line repeater structure comprising a plurality of floating electrodes disposed between the second layer and the third layer,
   wherein the plurality of electrodes are diamond-shape electrodes and arranged in a plurality of rows and a plurality of columns, wherein the plurality of floating electrodes comprises a first set of floating electrodes arranged in a diamond shape and disposed to overlap portions of at least two of the diamond-shape electrodes in a first row of the plurality of rows and to overlap portions of at least two of the diamond-shape electrodes in a first column of the plurality of columns.

2. The touch-sensing device of claim 1, wherein the second layer is a protective cover layer, and wherein the third layer is a coating film disposed over the protective cover layer.

3. The touch-sensing device of claim 1, wherein the plurality of floating electrodes comprises a second set of floating electrodes comprising:
   a first bar electrode that overlaps a first portion of a first diamond-shape electrode in the first column and a second portion of a second diamond-shape electrode in a second column; and
   a second bar electrode that overlaps a third portion of a third diamond-shape electrode in the first column and a fourth portion of a fourth diamond-shape electrode in the second column, and wherein the first bar electrode and the second bar electrode intersect over a fifth diamond-shape electrode in the first row.

4. The touch-sensing device of claim 3, wherein a pattern of the first set of floating electrodes and the second set of floating electrodes is repeated over the plurality of columns and the plurality of rows.

5. A touch-sensing device comprising:
- a capacitive-sense array comprising a plurality of electrodes disposed in a first layer;
- a second layer of material to cover the capacitive-sense array;
- a third layer of material disposed over the second layer; and
- a field-line repeater structure comprising a plurality of floating electrodes disposed between the second layer and the third layer, wherein the plurality of electrodes are arranged in a plurality of rows and a plurality of columns, wherein the plurality of floating electrodes comprises:
  - a first u-shape electrode disposed in a first orientation to overlap portions of a first electrode in a first column of the plurality of columns, a second electrode in a first row of the plurality of rows and a third electrode in a second row of the plurality of rows;
  - a second u-shape electrode disposed in a second orientation to overlap portions of a fourth electrode in a second column of the plurality of columns, the second electrode in the first row and the third electrode in the second row, wherein the second orientation is an opposite orientation of the first orientation and the first u-shape electrode and second u-shape electrode form an opening; and
  - a first bar electrode disposed within the opening, wherein the first bar electrode is to overlap portions of the first electrode in the first column and the fourth electrode in the second column.

6. The touch-sensing device of claim 5, wherein a pattern of the first u-shape electrode, second u-shape electrode and first bar electrode and second bar electrode is repeated over the plurality of columns and the plurality of rows.

7. The touch-sensing device of claim 5, wherein the plurality of electrodes are diamond-shape electrodes.

8. The touch-sensing device of claim 7, wherein the first bar electrode is disposed to further overlap the second electrode in the first row and the third electrode in the second row.

9. The touch-sensing device of claim 8, wherein the plurality of floating electrodes further comprises
- a second bar electrode disposed adjacent to one side of the first u-shape electrode and the second u-shape electrode, wherein the second bar electrode is disposed to overlap portions of the first electrode in the first row, the second electrode in the first row, the fourth electrode in the second column, a fifth electrode in the first column and a sixth electrode in the second column.

10. The touch-sensing device of claim 2, wherein the protective cover layer comprises at least one of glass or plastic, and wherein the coating film is at least one of an anti-shatter (AS) coating film, an anti-glare (AG) coating film or a scratch resistance film.

11. The touch-sensing device of claim 2, wherein the plurality of floating electrodes are floating conductive indium tin oxide (ITO) patches disposed between the coating film and the protective cover layer.

12. The touch-sensing device of claim 2, wherein the protective cover layer, coating film and the plurality of floating electrodes are transparent.

13. A method comprising:
- disposing a plurality of electrodes of a sense array in a first layer of a touch-sensing device;
- disposing a second layer of material to cover the sense array;
- disposing a third layer of material over the second layer; and
- disposing a field-line repeater structure comprising a plurality of floating electrodes between the second layer and the third layer, wherein the plurality of electrodes are diamond-shape electrodes, and wherein the disposing the plurality of electrodes comprises arranging the plurality of electrodes in a plurality of rows and a plurality of columns, and wherein the disposing the plurality of floating electrodes comprises disposing a first set of floating electrodes of the plurality of floating electrodes in a diamond-shape and to overlap portions of at least two of the diamond-shape electrodes in a first row of the plurality of rows and to overlap portions of at least two of the diamond-shape electrodes in a first column of the plurality of columns.

14. The method of claim 13, wherein the disposing the plurality of floating electrodes further comprises disposing a second set of floating electrodes of the plurality of floating electrodes, wherein the second set of floating electrodes comprises:
- a first bar electrode that overlaps a first portion of a first diamond-shape electrode in the first column and a second portion of a second diamond-shape electrode in a second column; and
- a second bar electrode that overlaps a third portion of a third diamond-shape electrode in the first column and a fourth portion of a fourth diamond-shape electrode in the second column, and wherein the first bar electrode and the second bar electrode intersect over a fifth diamond-shape electrode in the first row.

15. A method comprising:
- disposing a plurality of electrodes of a sense array in a first layer of a touch-sensing device;
- disposing a second layer of material to cover the sense array;
- disposing a third layer of material over the second layer; and
- disposing a field-line repeater structure comprising a plurality of floating electrodes between the second layer and the third layer, wherein the disposing the plurality of electrodes comprises arranging the plurality of electrodes in a plurality of rows and a plurality of columns, wherein the disposing the plurality of floating electrodes comprises:
  - disposing a first u-shape electrode in a first orientation to overlap portions of a first electrode in a first column of the plurality of columns, a second electrode in a first row of the plurality of rows and a third electrode in a second row of the plurality of rows;
  - disposing a second u-shape electrode in a second orientation to overlap portions of a fourth electrode in a second column of the plurality of columns, the second electrode in the first row and the third electrode in the second row, wherein the second orientation is an opposite orientation of the first orientation and the first u-shape electrode and second u-shape electrode form an opening; and
  - disposing a first bar electrode within the opening, wherein the first bar electrode is to overlap portions of the first electrode in the first column and the fourth electrode in the second column.

16. An apparatus comprising:

a substrate;

a capacitive-sense array comprising a plurality of electrodes disposed on a first side of the substrate; and a field-line repeater structure comprising a plurality of floating electrodes disposed on a second side of the substrate, wherein the plurality of electrodes are diamond-shape electrodes and arranged in a plurality of rows and a plurality of columns, wherein the plurality of floating electrodes comprises:

a first set of floating electrodes arranged in a diamond-shape and disposed to overlap portions of at least two of the diamond-shape electrodes in a first row of the plurality of rows and to overlap portions of at least two of the diamond-shape electrodes in a first column of the plurality of columns; and a second set of floating electrodes comprising:

a first bar electrode that overlaps a first portion of a first diamond-shape electrode in the first column and a second portion of a second diamond-shape electrode in a second column; and a second bar electrode that overlaps a third portion of a third diamond-shape electrode in the first column and a fourth portion of a fourth diamond-shape electrode in the second column, and wherein the first bar electrode and the second bar electrode intersect over a fifth diamond-shape electrode in the first row.

17. The apparatus of claim 16, further comprising a capacitance-sensing circuit coupled to the capacitive-sense array, wherein the capacitance-sensing circuit comprises:

a transmit (TX) signal generator to generate a TX signal to be applied to the plurality of electrodes of the sense array;

a receiver coupled to measure an receive (RX) signal on the plurality of electrodes of the sense array; and an analog-to-digital converter (ADC) coupled to an output of the receiver to convert the measured RX signal to a digital value.

18. The touch-sensing device of claim 5, wherein the second layer is a protective cover layer, and wherein the third layer is a coating film disposed over the protective cover layer.

19. The touch-sensing device of claim 18, wherein the protective cover layer comprises at least one of glass or plastic, and wherein the coating film is at least one of an anti-shatter (AS) coating film, an anti-glare (AG) coating film or a scratch resistance film.

20. The touch-sensing device of claim 18, wherein the plurality of floating electrodes are floating conductive indium tin oxide (ITO) patches disposed between the coating film and the protective cover layer.

* * * * *